United States Patent [19]
Shiraishi et al.

[11] Patent Number: 6,124,384
[45] Date of Patent: Sep. 26, 2000

[54] COMPOSITE RESIN COMPOSITION

[75] Inventors: Nobuo Shiraishi, Kyoto-fu; Masanobu Ajioka, Kanagawa-ken, both of Japan

[73] Assignee: Mitsui Chemicals, Inc., Japan

[21] Appl. No.: 09/134,382

[22] Filed: Aug. 14, 1998

[30] Foreign Application Priority Data

Aug. 19, 1997 [JP] Japan ..................................... 9-222827

[51] Int. Cl.$^7$ .............................. C08L 1/00; C08L 97/00; C08K 5/13
[52] U.S. Cl. ............................. 524/35; 524/72; 525/54.2; 525/54.21
[58] Field of Search .................................. 524/35, 47, 72; 525/54.2, 54.21, 54.24

[56] References Cited

U.S. PATENT DOCUMENTS 5,703,160 12/1997 Dehennau et al. ................... 525/54.24
5,861,461 1/1999 Lee et al. ............................. 525/54.26

*Primary Examiner*—Nathan M. Nutter
*Attorney, Agent, or Firm*—Burns, Doane, Swecker & Mathis, L.L.P.

[57] ABSTRACT

The invention provides a composite resin composition comprising aliphatic polyester resin (component A) having aliphatic hydroxycarboxylic acid units, one or more biomass material (component B) selected from the group consisting of cellulose, lignocellulose and starch and unsaturated carboxylic acid or a derivative thereof (component C), wherein the composite resin composition comprises a component obtained by covalently bonding a portion or the whole of component A and component B through component C. On processing into various formed items, the composite resin composition of the invention exhibits excellent tensile strength and other physical properties and processability and simultaneously has good biodegradability, and enable biomass materials of low added value to apply to high added value uses in a large amount.

16 Claims, No Drawings

COMPOSITE RESIN COMPOSITION

BACKGROUND OF THE INVENTION

1. Field of the Invention

The present invention relates to a composite material composition comprised of a constitutional element having biodegradability, and more specifically relates to a composite resin composition which has high processing ability on processing said composition, provides resulting processed articles having excellent mechanical strength and biodegradability, and can be effectively utilized for a film, sheet, tray and other one-way formed articles, furniture parts, construction materials, interiors for motor vehicle and household electrical appliances, and housing applications.

2. Description of the Related Art

Cellulose, wood, starch and other biomass materials have poor thermoplasticity and powdered materials, in particular, have been difficult to process by hot-press plastic forming as intact into boards and sheets.

Consequently, wood flour, in particular, which is a waste matter and exists on a huge amount is limited to utilization in a field of low added value such as straw mulching for cattle breeding and other farm and dairy materials and fillers. In the extreme cases, wood flour is burned without utilization.

Further, wood flour was utilized in Japan until several years ago as a raw material of activated carbon. The utilization was considered useful in view of environmental conservation. However, due to low degree of processing, import of the activated carbon from South East Asia and China is now increased and domestic products are extremely decreased.

Also as to the cellulose based waste, effective utilization of waste paper is not necessarily progressed. Development of new techniques for the practical application of waste paper is now desired in relation to fill out and effective date of recycle act which has now received attention (on waste paper and paper box, in the year 2000 A.D.).

As to starch, new development of practical use for various purposes other than foods has been desired in view of the present situation on the balance of world-wide demand or in consideration that there is space for increasing supply of starch.

From a still higher standpoint, a way of thinking that an organic material system using plant resources and cereals as a raw material will be required in the near future in order to apply a brake on the use of petroleum is beginning to sprout. As a fundamental response to such situation, it should be needed to have a sense of problem that an application technique of a biomass material will be steadily made up from the base.

Consequently, various investigations have been carried out on a high-grade utilization or a large-scale application of biomass materials. A typical example includes a molding material obtained by melt-kneading a thermoplastic resin with wood flour.

However, on the basis of the conventional technique, such a molding material prepared from thermoplastic resin and wood flour has been unsatisfactory to dispersibility, compatibility, adhesion ability of wood flour surface to matrix resin and mechanical property.

As a result of an intensive investigation in view of these problems, the present inventors have found that these problems can be solved by employing a modified resin for the matrix resin. That is, the present inventors have disclosed in Japanese Laid-Open Patent SHO 62-039642 a technique concerning a composite resin composition which is obtained by formulating a specific proportion of modified polyolefin, cellulosic material and specific graft compound, is extremely excellent in mechanical strength and also excellent in transparency and smoothness and suitable for interiors such as films, sheets and furniture.

Many investigations have been conducted on the application of the technique. As a result, an artificial wood of markedly high durability prepared by extrusion-forming a wood flour/thermoplastic resin composite kneaded material has come to be effectively used as a residential part.

These techniques use wood and other biomass materials as a filler and employ polypropylene, polyethylene, polyvinyl chloride, ABS resin and other general purpose resins for a matrix resin. It is thus very significant when good durability is required.

However, in consideration of the final waste disposal treatment after finishing use, the waste remains semipermanently in the environment when landfilled and emits hazardous wastes into the environment when incinerated.

SUMMARY OF THE INVENTION

One of the objects to be solved by the invention is to provide a degradable composite resin composition which is comprised of a biodegradable resin and biomass material and is remarkably improved in the dispersibility of the biomass material into the biodegradable resin, compatibility of the biodegradable resin and the biomass material, adhesion of the surface of biomass material to the matrix biodegradable resin, mechanical properties in the processing time and thermal flow processing ability; a preparation process of the degradable composite resin composition; and a molding material comprised of said degradable composite resin composition.

Another object to be solved by the invention is to provide a molding material which is comprised of a biodegradable resin and biomass material and, when in consideration of the final waste disposal step after finishing the use of product, degrades without remaining in the environment on landfilling and emits no hazardous material into the environment on incineration.

A further object to be solved by the invention is to provide a molding material which is comprised of a biodegradable resin and biomass material and, when in consideration of the final waste disposal step after finishing the use of product from disposable application to consumer durable goods such as construction materials, motor vehicle interiors and exteriors, housing of household electric appliances and miscellaneous parts, degrades without remaining in the environment on land-filling and emits no hazardous material into the environment on incineration.

A still further object to be solved by the invention is to provide a molded article, artificial wood, container, film, sheet, tray and foam obtained by processing a composite resin composition which is comprised of a biodegradable resin and biomass material and, when in consideration of the final waste disposal step after finishing the use of the product, degrades without remaining in the environment on landfilling and emits no hazardous material into the environment on incineration.

The present inventors have carried out an intensive investigation in order to develop a composite composition of a biodegradable resin and biomass materials such as biodegradable wood flour. As a result, they have found that unsaturated carboxylic acid or derivative thereof, aliphatic polyester having aliphatic polyhydroxycarboxylic acid units and biomass materials such as wood flour or starch are heated and kneaded to obtain a composite resin composition which provides a molded article having a high melt flowability in the processing step, good mechanical strength, and high smoothness and gloss on the surface. Thus, the present invention has been completed on the basis of the information.

That is, an aspect of the invention is a preparation process of a composite resin composition comprising heating and kneading a mixture of 5–95 % by weight of aliphatic polyester resin (component A) having aliphatic hydroxycarboxylic acid units and 95–5 % by weight of one or more biomass materials (component B) selected from the group consisting of cellulose, lignocellulose and starch, and 1–30 parts by weight for 100 parts by weight of component A of unsaturated carboxylic acid or a derivative thereof (component C) in the presence of a radical generator.

Another aspect of the invention is a composite resin composition comprising a mixture of 5–95% by weight of aliphatic polyester resin (component A) having aliphatic hydroxycarboxylic acid units and 95–5 % by weight of one or more biomass materials (component B) selected from the group consisting of cellulose, lignocellulose and starch, and 130 parts by weight for 100 parts by weight of component A of unsaturated carboxylic acid or a derivative thereof (component C), wherein said composite resin composition comprises a component obtained by covalently bonding a portion or the whole of component A and component B through component C.

A further aspect of the invention is a preparation process of a composite resin composition comprising obtaining modified aliphatic polyester (component D) having aliphatic hydroxycarboxylic acid units by heating and reacting 100 parts by weight of aliphatic polyester resin (component A) having aliphatic hydroxycarboxylic acid units and 1–30 parts by weight of unsaturated carboxylic acid or a derivative thereof (component C) in the presence or absence of a solvent in the presence of a radical generator, and successively heating and kneading a mixture of 5–95 % by weight of a mixture (component E) of 0–95 % by weight of component A and 100–5 % by weight of component D, and 95–5 % by weight of one or more biomass materials (component B) selected from the group consisting of cellulose, lignocellulose and starch.

A still further aspect of the invention is a composite resin composition comprising a mixture (component E) of 0–95 % by weight of aliphatic polyester resin (component A) having aliphatic hydroxycarboxylic acid units and 100–5 % by weight of modified aliphatic polyester resin (component D) having aliphatic hydroxycarboxylic acid units which is obtained by reacting 100 parts by weight of component A with 1–30 parts by weight of unsaturated carboxylic acid or a derivative thereof (component C), and one or more biomass materials (component B) selected from the group consisting of cellulose, lignocellulose and starch, wherein said composite resin composition comprises a component obtained by covalently bonding a portion or the whole of component A and component B through component C and component B is 5–95 % by weight of component B and component D or component E.

A still further aspect of the invention involves processed articles, artificial wood, container, film, sheet, tray and foam comprised of the composite resin composition of the invention.

DETAILED DESCRIPTION OF PREFERRED EMBODIMENTS

The composite resin composition of the invention can be obtained by heating, kneading and reacting all together aliphatic polyester resin (component A) having aliphatic hydroxycarboxylic acid units, biomass material (component B) and unsaturated carboxylic acid or a derivative thereof (component C) (one step process). In another process, aliphatic polyester resin (component A) having aliphatic hydroxycarboxylic acid units is heated and reacted with unsaturated carboxylic acid or a derivative thereof (component C) in the presence of a radical generator to obtain modified aliphatic polyester resin (component D) having aliphatic hydroxycarboxylic acid units and successively component D or, when necessary, a mixture of component D and component A is heated and kneaded with biomass material (component B) (two step process).

The raw materials used for the invention will be illustrated first.

The aliphatic polyester resin (component A) having aliphatic hydroxycarboxylic acid unit which can be used for the invention is aliphatic homopolyester, copolyester or a mixture thereof which contains aliphatic hydroxycarboxylic acid units in the polymer. No particular restriction is imposed upon the amount of aliphatic hydroxycarboxylic acid units in the polymer. The amount is preferably 50% by weight or more. When the aliphatic polyester resin (component A) having aliphatic hydroxycarboxylic acid units is a copolymer, the arrangement mode can be any of random copolymer, alternate copolymer, block copolymer and graft copolymer.

That is, the aliphatic polyester resin (component A) having aliphatic hydroxycarboxylic acid units includes the following aliphatic polyester, 1) Aliphatic hydroxycarboxylic acid homopolymer, for example, polylactic acid or poly-$\epsilon$-caprolactone,
2) A copolymer of aliphatic hydroxycarboxylic acid with other aliphatic hydroxycarboxylic acid, for example a block copolymer of polylactic acid and poly-$\epsilon$-caprolactone, a random copolymer of lactic acid and glycolic acid,
3) A copolymer with aliphatic hydroxycarboxylic acid, aliphatic polyhydric alcohol and aliphatic polycarboxylic acid or anhydride thereof, for example, a block copolymer of polylactic acid and polybutylene succinate, a random copolymer of lactic acid, succinic acid and ethylene glycol, and
4) A star polymer having aliphatic hydroxycarboxylic acid and aliphatic polyhydric alcohol, aliphatic polycarboxylic acid or polysaccharide as a nucleus, and a polymer which is obtained by combining said star polymer with aliphatic polyhydric alcohol or aliphatic polycarboxylic acid, for example, a star polymer having glycerol, pentaerythritol, 1,2,3,4-butanetetracarboxylic acid or ethylcellulose as a nucleus and polylactic acid as a side chain and a polymer which is obtained by combining said star polymer with pentaerythritol or 1,2,3,4-butanetetracarboxylic acid.

No particular restriction is imposed upon the aliphatic hydroxycarboxylic acid which is a raw material of aliphatic polyester resin (component A) having aliphatic hydroxycarboxylic acid units. Exemplary aliphatic hydroxycarboxylic acids include, for example, glycolic acid, lactic acid, 3-hydroxybutyric acid, 4-hydroxybutyric acid, 4-hydroxyvaleric acid, 5-hydroxyvaleric acid and 6-hydroxycaproic acid, and further include cyclic esters of aliphatic hydroxycarboxylic acid, for example, glycolide which is a dimer of glycolic acid, lactide which is a dimer of lactic acid and $\epsilon$-caprolactone which is a cyclic ester of 6-hydroxycaproic acid. These aliphatic hydroxycarboxylic acids can be used as a mixture. When aliphatic hydroxycarboxylic acid has asymmetric carbon atoms, D-isomer and L-isomer can be used singly, respectively. A mixture of these isomers, that is, racemic isomer can also be used.

No particular restriction is imposed upon the aliphatic polycarboxylic acid or the anhydride thereof which is a raw material of aliphatic polyester resin (component A) having aliphatic hydroxycarboxylic acid units used in the invention. Representative aliphatic polycarboxylic acids and anhydrides include, for example, oxalic acid, succinic acid, malonic acid, glutaric acid, adipic acid, pimelic acid, suberic acid, azelaic acid, sebacic acid, undecane diacid, dodecane diacid and other aliphatic dicarboxylic acids; 1,2,3,4,5,6-cyclohexanehexacarboxylic acid, 1,2,3,4-cyclopentanetetracarboxylic acid, tetrahydrofuran-2R, 3T, 4T, 5C-tetracarboxylic acid, 1,2,3,4-cyclobutanetetracarboxylic acid, 4-carboxy-1,1-cyclohexanediacetic acid, 1,3,5-cyclohexanetricarboxylic acid, $(1\alpha,3\alpha,5\beta)$-1,3,5-trimethyl-1,3,5-cyclohexanetricarboxylic acid and other three functional or more aliphatic or alicyclic polycarboxylic acids, or anhydrides of these compounds. These aliphatic polycarboxylic acids or anhydrides can be used as a mixture when necessary. When these compounds have an asymmetric carbon in the molecule, D-isomer and L-isomer can be used singly, respectively. A mixture of D-isomer and L-isomer, that is, a racemic isomer can also be used.

No particular restriction is imposed upon the aliphatic polyhydric alcohol which is a raw material of aliphatic polyester resin (component A) having aliphatic hydroxycarboxylic acid units in the invention. Specific polyhydric alcohols which can be used include, for example, ethylene glycol, diethylene grlycol, triethylene glycol, polyethylene glycol, propylene glycol, dipropylene glycol, 1,3-butanediol, 1,4-butanediol, 3- methyl-1,5-pentanediol, 1,6-hexanediol, 1,9-nonanediol, neopentyl glycol, polytetramethylene glycol, 1,4-hexanediol, cyclohexanedimethanol, hydrogenated bisphenol-A and other diols; glycerol, pentaerythritol, dipentaerythritol, trimethylolethane, trimethylolpropane, inositol and other three or more functional polyols, and further include cellulose, cellulose nitrate, acetyl cellulose, nitrocellulose; cellophane, viscose rayon, cupra and other regenerated cellulose, hemicellulose, starch, amylopectin, dextrin, dextran, glycogen, pectin, chitin, chitosan and derivatives of these matters and polysaccharides. These aliphatic polyhydric alcohols can be used as a mixture when necessary. When these aliphatic polyhyudric alcohols have asymmetric carbon in the molecule, D-isomer and L-isomer and D-isomer, that is, a racemic isomer can also be used.

The above various aliphatic homopolyester or copolyester can be used aliphatic polyester resin (component A) having aliphatic hydroxycarboxylic acid units, and the polyester having a lactic acid units is preferred. More preferably, 50% by weight or more lactic acid units are contained in the polyester.

Specific examples of aliphatic polyester resin composition having lactic acid units which can be preferably used in the invention include polylactic acid, random or block copolymer of lactic acid and 6-hydroxycaproic acid, block copolymer of polylactic acid and polybutylene succinate, a star polymer having pentaerythritol, 1,4-butanetetracarboxylic acid or ethyl cellulose as a nucleus and polylactic acid as a side chain and a polymer which is obtained by combining said star polymer with pentaerythritol or 1,4-butanediol.

No particular restriction is imposed upon the preparation process of aliphatic polyester resin having aliphatic hydroxycarboxylic acid units (component A) of the invention. Component A can be prepared by known processes, for example, direct dehydration polycondensation and ring-opening polymerization.

For example, U.S. Pat. No. 5,310,865 has disclosed a preparation process of homopolymer or copolymer of aliphatic hydroxycarboxylic acid by direct hydration polycondensation and not by ring-opening polymerization. In the process, lactic acid and when necessary, other aliphatic hydroxycarboxylic acids are subjected to azeotropic dehydration condensation preferably in the presence of an organic solvent, diphenyl ether based solvent in particular, and more preferably, the polymerization is conducted by removing water from the azeotropically distilled solvent and returning the substantially anhydrous solvent to the reaction system. Such process can provide homopolymer or copolymer of aliphatic hydroxycarboxylic acid which is suited for use in the invention.

Suitable molecular weight regulator, branching agent and other modifiers can also be added in the preparation of aliphatic polyester (component A) resin having aliphatic hydroxycarboxylic units.

No particular restriction is imposed upon the molecular weight and molecular weight distribution of aliphatic polyester resin (component A) having aliphatic hydroxycarboxylic acid units of the invention. In view of thermal and mechanical properties, the weight average molecular weight (Mw) is preferably 30,000 or more, more preferably 50,000 to 1,000,000.

The biomass materials (component B) used in the invention are one or more substances selected from cellulose, lignocellulose and starch.

Exemplary cellulose which can be used includes alpha fiber flock obtained by alkali-treating wood pulp and subjecting to mechanical chopping, cotton linter and cotton flock prepared from cotton seed, and rayon silk-cut rayon flock.

Exemplary lignocellulose includes lignocellulose fiber and lignocellulose powder, and can practically exemplify wood pulp, refiner graft pulp (RGP), paper pulp, waste paper, crushed wood chip, wood flour and fruit hull powder.

No particular restriction is put on the shape of these cellulose and lignocellulose materials and fiber or powder can be preferably used.

Representative wood flour which can be used includes, for example, ground products, saw dust and shavings of pine, fir, bamboo, bagasse, oil palm stem and popula, and fruit hull powder includes ground products of fruits of walnut, peanuts and palm. When wood flour is used, the wood flour is finely pulverized as fine as possible to preferably remove entanglement of the fibers. However, in view of complex working and economy, powder having a particle size of 20 to 400 mesh is usually used.

RGP and wood flour are preferred in particular. When RGP is used, dry split yarn is preferably used after untying entanglement of the fibers.

Exemplary starch which can be widely used in the invention includes, for example, corn starch, potato starch, taro starch, tapioca starch and lightly acetylated products of these starches. Starch is usually obtained in the form of granules and can be used intact.

The unsaturated carboxylic acid or a derivative thereof (component C) which can be used in the invention preferably includes, for example, maleic acid, maleic anhydride, nadic acid, itaconic acid itaconic anhydride, citraconic acid, citraconic anhydride, crotonic acid, isocrotonic acid, mesaconic acid, angelica acid, sorbic acid and acrylic acid. Maleic anhydride is preferred in particular. Derivatives of the unsaturated carboxylic acid which can be used include metal salt, amide, imide, and ester of the above unsaturated carboxylic acids. These unsaturated carboxylic acids or anhydrides can be used as a mixture.

No particular restriction is imposed upon the radical generator used in the invention so long as the generator accelerates the reaction between the aliphatic polyester resin (component A) having aliphatic hydroxycarboxylic acid units and unsaturated carboxylic acid or a derivative thereof (component C). Exemplary radical generators which can be suitably used include, for example, benzoyl peroxide, lauroyl peroxide, cumene hydroperoxide, α,α'-bis(t-butylperoxydiisopropyl)benzene, di-t-butyl peroxide, 2,5-di (t-butylperoxy)hexane, p-chlorobenzoyl peroxide, acetyl peroxide, 1,1-t-butylperoxy-3,3,5-trimethylcyclohexane, t-butylperoxypivalate, t-butylperoxy-2-ethylhexanoate, t-butylperoxybenzoate, bis(4-t-butylcyclohexyl) peroxydicarbonate, diisopropylperoxydicarbonate, t-butylperoxyisopropylcarbonate, and other peroxides; and azobisisobutyronitrile and other azo compounds.

Next, the preparation process of the composite resin composition of the invention will be illustrated in detail.

One of the preparation process of the invention is a process for heating and kneading aliphatic polyester resin (component A) having aliphatic hydroxycarboxylic acid units, biomass material (component B) and unsaturated carboxylic acid or a derivative thereof (component C) all together in the presence of a radical generator (one step process).

As to the content of component A and component B, the content of component A is 5–95% by weight, preferably 10–90% by weight for the total amount of component A and component B. When the content of component A exceeds 95% by weight, the content of component B becomes too small and the reinforcing effect of component B unfavorably decreases. On the other hand, when the content of component A is less than 5% by weight, the content of component B becomes too much and impairs the strength of the molded articles or unfavorably provides a defective molded article having poor transparency and gloss.

The amount of component C is 1 part by weight or more, preferably 1–30 parts by weight for 100 parts by weight of component A. When the amount of component C is less than 1 part by weight, a covalently bonded component of component A and component B through component C cannot be obtained or is obtained in an insufficient amount, whereby mechanical strength and hot-melt flowability which are expected for the molded article cannot be obtained. On the other hand, when the amount of component C exceeds 30 parts by weight, further improved mechanical strength cannot be obtained and the molded article is liable to become brittle.

No particular restriction is imposed upon the amount of radical generator. The radical generator is commonly used in an amount of 0.01–1 part by weight for 100 parts by weight of component A.

In the preparation process of the invention, heating and kneading can be carried out by conventionally known procedures. For example. By using Banbury mixer, Henschel mixer and other mixers, roll mill having plural rolls, kneader and various types of extruders, the materials are heated and kneaded at a temperature higher than the melting point of component A, preferably at 140°–240° C., more preferably at 160°–200° C., for 5–50 minutes, preferably for 10–30 minutes. Rotational velocity of a kneader is usually 30–200 rpm, preferably 50–150 rpm. High temperature which leads to scorching of component B should be avoided.

No particular restriction is out upon the order of addition on the heating and kneading of each component. Generally component B and component C are preferably added to the molten state of component A.

Furthermore, heating and kneading are preferably carried out in an inert gas atmosphere so as to avoid contamination of moisture from outside of the system, and can also be carried out while ventilating or bubbling an inert gas.

Another preparation process of the invention is to heat and react aliphatic polyester resin (component A) having aliphatic hydroxycarboxylic acid units with unsaturated carboxylic acid or a derivative thereof (component C) in the presence of a radical generator in the presence or absence of a solvent to obtain modified aliphatic polyester resin (component D) having aliphatic hydroxycarboxylic acid units, and successively to heat and knead said modified aliphatic polyester resin (component D) having aliphatic polyhydroxycarboxylic acid units or a mixture of component D and aliphatic polyester resin (component A) having aliphatic hydroxycarboxylic acid units with biomass materials (component B) (two step process).

In this case, the amount of component C for the amount of component A and the amount of the radical generator is the same as the above one step process.

The procedures for reaction component A with component C are the same as the above heating and kneading procedures.

Further, component A and component C can also be reacted in the presence of a solvent. A high-boiling solvent capable of dissolving component A is preferably used. Reaction temperature is 140°–240° C., preferably 160°–200° C. and reaction time is 1–5 hours. After finishing the reaction, the solvent is removed by distillation, reprecipitation or other known methods to obtain component D.

The addition ratio of component C in modified aliphatic polyester resin (component D) having aliphatic hydroxycarboxylic acid unit is 0.1–15% by weight, preferably 0.5–10% by weight.

Thus obtained component D can be heated and kneaded as intact with component B. However, in consideration of a mixing ratio of component B and component D, a mixture (component E) obtained by diluting component D with component A can also be used when necessary. That is, a mixture (component E) of component D and component A containing 0–95% by weight of component A can also be used.

The procedures for heating and kneading component D or component E and component B can also be carried out similarly to the above one step process.

In such a case, the proportion of component D or component E to component B is that component D or component E occupies 5–95% by weight for total amount of component D or component E and component B, preferably 10–90% by weight. When the proportion of component D or component E exceeds 95% by weight, the proportion of component B becomes too small and the reinforcing effect of component B unfavorably decreases. On the other hand, when the proportion of component D or component E is less than 5% by weight, the proportion of component B becomes too much, and leads to unfavorably provide molded articles having deficiency in strength and poor transparency and gloss.

In the preparation process of the composite resin composition of the invention and below described various processing methods, lubricant, antioxidant, colorant, antistatic agent, plasticizers and other miscellaneous additives can be suitably added when necessary.

The composite resin composition thus obtained is excellent in mechanical strength and hot-melt flowability in the processing step and can provide molded articles having biodegradability and excellent can provide smoothness and gloss.

The composite resin composition of the invention comprises a component obtained by covalently bonding a portion or more of aliphatic polyester resin (component A) having aliphatic hydroxycarboxylic acid units and a portion or more of biomass materials (component B) through unsaturated carboxylic acid or a derivative thereof (component C).

The presence of a component obtained by covalently bonding compound A and component B through component C brings the above various properties and particularly contributes to the improvement in tensile strength and heat flowability on processing the composite resin composition of the invention into molded articles.

The composite resin composition of the invention can be suitably processed into desired shape by means of pressure molding, film forming, vacuum forming, extruding and injection molding to prepare various formed items.

Consequently, the composite resin composition of the invention has an extremely high utilization in industry. That is, the present invention can provide processed items having excellent properties and when in consideration of the final waste disposal step after finishing the use of the product, degrades without remaining in the environment on landfilling and emits no hazardous material into the environment on incineration.

The present invention can provide processed items, artificial wood, container, film, sheet, tray and foam which are excellent in tensile strength, tensile elongation at break, tensile modulus and other mechanical strengths.

The composite resin composition of the invention can be effectively used as a stock for various film and sheet materials, disposable formed items such as container, pipe, square bar, rod, artificial wood, tray, concrete panel and foam, furniture, construction material, motor vehicle interiors and exteriors, household electronic housing, civil engineering and construction materials, materials for agriculture, dairy forming and marine products industry, recreational materials and sporting materials.

Thus, the present invention enables biomass materials which have conventionally low added value utilization to serve for high grade utilization and moreover, provides a composite resin composition which is excellent in strength properties and has biodegradability which can be provided with ease in industry at a relatively moderate price.

EXAMPLES

The examples of the invention will be illustrated hereinafter. However, the invention is not construed to be limited by the method and equipment described below.

In the examples, physical properties were measured by following methods.

1) Tensile strength, elongation at break and tensile modulus Measured in accordance with JIS K-6732.
2) Melt viscosity and heat flow temperature Measured by using Flow Tester CFT-C.

Examples 1–10

Into a beaker, 23 parts by weight of powdery polylactic acid having a weight average molecular weight of 130,000 (PLA: manufactured by Mitsui Chemicals Inc.), 2.3 parts by weight of maleic anhydride and 0.08 parts by weight of dicumyl peroxide were weighed, thoroughly mixed, and immediately poured into a 30 ml volume chamber of a kneader. The kneader used was a laboplastomill manufactured by Toyo Seiki Co. The plastomill was previously controlled at 160° C. and stirring blades were rotated at a rate of 30 rpm in the reverse direction relative to each other. After charging, the rate of the stirring blades was immediately increased to 70 rpm and the mass was reacted by kneading at 160° C. for 15 minutes. After finishing the reaction, the reaction mass was immediately discharged and cooled. After cooling sufficiently, the reaction mass was pulverized with a plastic grinder and used in the successive experiments as maleic anhydride modified polylactic acid (MPLA-1).

MPLA-1 thus obtained was purified by dissolving in chloroform, pouring into a large amount of n-pentane to carry out precipitation, filtering the precipitate and drying the filter cake. The addition ratio of maleic anhydride to PLA was measured by titration. The addition ratio was 1.1% by weight. The titration was carried out by the following procedures. That is, 0.2 g of a sample of MPLA-1 was purified by the procedure above described and dissolved in 50 ml of a 1:1 by volume mixture of chloroform and ethanol and was titrated by 0.1N-NaOH ethanol solution. A 1:1 mixture of bromthymol blue and phenol red was used as an indicator. At the endpoints, the color was changed from yellow to light violet. The titration was carried out 5 times and the average value was employed. The addition ratio of maleic anhydride was calculated from the following equation, Addition ratio of maleic acid (%)=$W_1/W_0 \times 100$ wherein $W_0$ is a weight of the sample and $W_1$ is a weight of maleic anhydride in the titrated sample.

Successively, MPLA-1 prepared as above, unmodified powdery polylactic acid having a weight average molecular weight of 130,000(PLA: manufactured by Mitsui Chemicals Inc.) and 200 mesh pass wood flour (Cellulosin) were weighted into a beaker at a prescribed ratio shown in Table 1 in a total amount of 26 g, thoroughly mixed and poured over 5 minutes into a labo-plastomill (manufactured by Toyo Seiki Co.) temperature-conditioned at 180° C. and equipped with blades rotating in the reverse direction relative to each other at a rate of 30 rpm. The mass was successively kneaded at the same condition for 15 minutes.

Next, the kneaded mass thus obtained was compression molded at 200° C. for 0.5 minutes to obtain a film having a thickness of 0.4 mm. Rectangular specimens having dimensions of 80 mm×5 mm were prepared from the film, and tensile strength properties and heat flow properties were evaluated. Results are illustrated in Table 2.

Comparative Example 1

Powdery polylactic acid having a weight average molecular weight of 130,000 (PLA: manufactured by Mitsui Chemicals Inc.) and 200 mesh pass wood flour (Cellulosin) were weighed into a beaker in an amount of 13.0 g, respectively. These two materials were thoroughly mixed and poured over 5 minutes into a labo-plastomill (manufactured by Toyo Seiki Co.). The labo-plastomill was controlled at 180° C. and stirring blades rotated at a rate of 30 rpm in the reverse direction relative to each other. The mass was successively kneaded under the same condition for 15 minutes.

Next, the kneaded mass obtained was compression molded at 200° C. for 0.5 minutes to prepare a film having a thickness of 0.4 mm. Rectangular specimens having dimensions of 80 mm×5 mm were prepared from the film and tensile strength properties and heat flow properties were evaluated. Results are shown in Table I and Table 2.

TABLE 1

| | | Composition (parts by weight) | | |
|---|---|---|---|---|
| | | Composition E | | |
| | | Component A | Component D | Component B |
| Example | 1 | 45 | 5 | 50 |
| | 2 | 40 | 10 | 50 |
| | 3 | 35 | 15 | 50 |
| | 4 | 30 | 20 | 50 |
| | 5 | 25 | 25 | 50 |
| | 6 | 20 | 30 | 50 |
| | 7 | 15 | 35 | 50 |
| | 8 | 10 | 40 | 50 |
| | 9 | 5 | 45 | 50 |
| | 10 | 0 | 50 | 50 |
| Comparative Example | 1 | 50 | | 50 |

Component A: unmodified PLA
Component B: wood flour
Component D: modified PLA (MPLA-1)
Component E: mixture of unmodified PLA and modified PLA (MPLA-1)

TABLE 2

| | | Evaluation results | | | | |
|---|---|---|---|---|---|---|
| | | Tensile strength (MPa) | Elongation at break (%) | Tensile Modulus (Mpa) | Melt Viscosity (poise) | Heat flow Temperature (° C.) |
| Example | 1 | 48.2 | 1.46 | 2521.2 | 9099 | 180.0 |
| | 2 | 48.3 | 1.65 | 2477.1 | 8042 | 180.0 |
| | 3 | 41.2 | 1.83 | 1704.2 | 6059 | 175.0 |
| | 4 | 43.1 | 2.03 | 1500.0 | 5531 | 170.0 |
| | 5 | 49.8 | 2.58 | 2496.2 | 5421 | 175.0 |
| | 6 | 41.3 | 1.97 | 3082.3 | 1767 | 170.0 |
| | 7 | 44.0 | 2.38 | 2659.5 | 4433 | 170.0 |
| | 8 | 39.3 | 1.93 | 2744.9 | 5571 | 165.0 |
| | 9 | 45.8 | 2.25 | 2717.0 | 4298 | 165.0 |
| | 10 | 39.3 | 2.59 | 2142.0 | 1968 | 170.0 |
| Comparative Example | 1 | 29.2 | 1.29 | 2504.5 | 6756 | 180.0 |

Examples 11–19

The same procedures as Examples 1–10 were carried out except that 200 mesh pass wood flour (Cellulosin) was replaced by corn starch. Results are shown in Table 3 and Table 4.

Example 20

The same procedures as Example I were carried out except that 4.6 parts by weight of maleic anhydride and 0.1 part by weight of dicumyl peroxide were used. Modified PLA (MPLA-2) was obtained by carrying out the reaction similarly to Example 1. After purifying by the same procedures as Example 1, the ratio of maleic acid addition was measured by titration. The addition ratio was 1.3% by weight.

The same procedures as Example 10 were carried out except that 200 mesh wood flour was replaced by corn starch and MPLA-1 was replaced by MPLA-2. Results are shown in Table 3 and Table 4.

Comparative Example 2

The same procedures as Comparative Example 1 were carried out except that 200 mesh pass wood flour (Cellulosin)(component B) was replaced by corn starch. Results are shown in Table 3 and Table 4.

TABLE 3

| | | Composition (parts by weight) | | |
|---|---|---|---|---|
| | | Component E | | |
| | | Component A | Component D | Component B |
| Example | 11 | 45 | 5 | 50 |
| | 12 | 40 | 10 | 50 |
| | 13 | 35 | 15 | 50 |
| | 14 | 30 | 20 | 50 |
| | 15 | 25 | 25 | 50 |
| | 16 | 20 | 30 | 50 |
| | 17 | 15 | 35 | 50 |
| | 18 | 10 | 40 | 50 |
| | 19 | 5 | 45 | 50 |
| | 20 | 0 | 50 | 50 |
| Comparative Example | 2 | 50 | 0 | 50 |

Component-A: unmodified PLA
Component-B: starch
Component-D: modified PLA (MPLA-1)
Component-E: mixture of unmodified PLA and modified PLA (MPLA-1).
Example 20 alone used modified PLA (MPLA-2).

TABLE 4

| | | Evaluation results | | | | |
|---|---|---|---|---|---|---|
| | | Tensile strength (MPa) | Elongation at break (%) | Tensile Modulus (Mpa) | Melt Viscosity (poise) | Heat flow Temperature (° C.) |
| Example | 11 | 31.2 | 2.04 | 1821.2 | 14320 | 175.0 |
| | 12 | 33.0 | 2.20 | 1560.3 | 8828 | 170.0 |
| | 13 | 35.3 | 2.35 | 1884.3 | 7103 | 170.0 |
| | 14 | 42.2 | 2.70 | 2146.0 | 6863 | 170.0 |
| | 15 | 31.2 | 2.15 | 1943.6 | 4083 | 170.0 |
| | 16 | 31.1 | 2.19 | 1533.1 | 1960 | 170.0 |
| | 17 | 23.2 | 1.76 | 1860.1 | 994 | 170.0 |
| | 18 | 36.1 | 2.09 | 1533.9 | 1361 | 165.0 |
| | 19 | 31.4 | 1.71 | 1529.8 | 360 | 165.0 |
| | 20 | 32.1 | 2.01 | 1610.1 | 192 | 165.0 |
| Comparative Example | 2 | 28.3 | 2.17 | 1498.8 | 14830 | 175.0 |

Examples 21–24

The same procedures as Examples 1–10 were carried out except that 200 mesh pass wood flour (Cellulosin) was replaced by cellulose fine powder (Wattman CF-11). Results are illustrated in Table 5 and Table 6.

Comparative Example 3

The same procedures as Comparative Example 1 were carried out except that 200 mesh pass wood flour (Cellulosin) was replaced by cellulose fine powder (Wattinen CF-11). Results are illustrated in Table 5 and Table 6.

TABLE 5

| | | Composition (parts by weight) | | |
|---|---|---|---|---|
| | | Component E | | |
| | | Component A | Component D | Component B |
| Example | 21 | 45 | 5 | 50 |

TABLE 5-continued

| | Composition (parts by weight) | | |
|---|---|---|---|
| | Component E | | |
| | Component A | Component D | Component B |
| | 22 | 40 | 10 | 50 |
| | 23 | 20 | 30 | 50 |
| | 24 | 0 | 50 | 50 |
| Comparative Example 3 | 50 | 0 | 50 |

Component A: unmodified PLA
Component B: cellulose fine powder
Component D: modified PLA (MPLA-1)
Component E: mixture of unmodified PLA and modified PLA (MPLA-1)

TABLE 6

| | Evaluation results | | | | |
|---|---|---|---|---|---|
| | Tensile strength (MPa) | Elongation at break (%) | Tensile Modulus (Mpa) | Melt Viscosity (poise) | Heat flow Temperature (° C.) |
| Example 21 | 56.2 | 2.21 | 3620 | 3720 | 170 |
| 22 | 56.4 | 2.30 | 3818 | 3653 | 170 |
| 23 | 55.9 | 2.19 | 3960 | 3620 | 170 |
| 24 | 26.6 | 2.23 | 3730 | 3623 | 170 |
| Comparative Example 3 | 54.6 | 2.12 | 3514 | 15390 | 175 |

Examples 25–27

In a prescribed proportion illustrated in Table 7, powdery polylactic acid having a weight average molecular weight of 130,000 (PLA: manufactured by Mitsui Chemicals Inc.), cellulose fine powder (component B), maleic anhydride (component C) and dicumyl peroxide (component X) were weighed into a beaker in a total amount of 26 g, thoroughly mixed and poured over 5 minutes into the same laboplastomill as used in Example 1. Successively, kneading was carried out for 15 minutes under the same conditions as Example 1.

The kneaded mass thus obtained was compression molded by the same procedures as Example I to prepare a film having a thickness of 0.4 mm. Rectangular specimens having dimensions of 80 mm×5 mm were cut from the film and tensile properties and heat flow properties were evaluated. Results are shown in Table 8.

TABLE 7

| | Composition (parts by weight) | | | |
|---|---|---|---|---|
| | Component A | Component B | Component C | Component X |
| Example 25 | 50 | 50 | 2.5 | 0.38 |
| 26 | 50 | 50 | 5.0 | 0.75 |
| 27 | 50 | 50 | 7.5 | 1.13 |
| Comparative Example 30 | 50 | 50 | 0 | 0 |

Component A: unmodified PLA
Component B: cellulose fine powder
Component C: maleic anhydride
Component X: dicumyl peroxide

TABLE 8

| | Evaluation results | | | | |
|---|---|---|---|---|---|
| | Tensile strength (MPa) | Elongation at break (%) | Tensile Modulus (Mpa) | Melt Viscosity (poise) | Heat flow Temperature (° C.) |
| Example 25 | 58.0 | 2.46 | 3450 | 3868 | 170 |
| 26 | 64.6 | 2.27 | 4123 | 3624 | 170 |
| 27 | 59.5 | 2.20 | 3980 | 2610 | 170 |
| Comparative Example 3 | 54.6 | 2.12 | 3514 | 15390 | 175 |

When Examples 1–10 and Comparative Example 1 are compared in the evaluation results of Table 1 and Table 2, it is understood that substitution of maleic anhydride modified polylactic acid for a portion of unmodified polylactic acid brings 1.7 times increase at maximum in the tensile strength of the molded film. Moreover, it is quite surprising that the similar level of tensile strength increasing effect can be obtained by merely substituting 20% by weight of unmodified polylactic acid for maleic anhydride modified polylactic acid. The information strongly suggests that maleic anhydride modified polylactic acid functions as a reactive compatibilyzer.

That is, it is suggested that the maleroyl group of maleic anhydride modified polylactic acid reacts with a hydroxyl group on the surface of wood flour during the kneading at 180° C. for 20 minutes and that polylactic acid is grafted by ester linkage on the surface of wood flour. And the intersurface adhesion in the processing article is also suggested to enhance between wood flour filler and matrix resin, that is, modified or unmodified polylactic acid. Further, heat flow processing ability is not impaired and high processing ability is maintained.

When Example 11–20 are compared with Comparative Example 2 in the results of Table 3 and Table 4, that is, as compared with using unmodified polylactic acid alone as a matrix resin, substitution of a portion of unmodified polylactic acid for maleic anhydride modified polylactic acid is understood to bring remarkable increase in the strength of the obtained molded film which reaches to 1.49 times at a maximum.

When Examples 1–20 are compared with Comparative Examples 1 and 2 in the results of Tables 1–4, melt viscosity becomes lower with increase in the content of maleic anhydride modified polylactic acid (component D) in the matrix resin of component E.

Addition of modified polylactic acid (component D) to the matrix resin of component E results in a composite having high processing ability and degree of the processing ability enhances with increase in the modified polylactic acid content. Dispersibility of the filler (component-B) is also improved by addition of modified polylactic acid to the matrix resin, component E.

As mentioned above, these results are considered to further strongly prove the consideration that maleic anhydride modified polylactic acid acts as a reactive compatibilyzer.

Further, as clearly understood from the results of Table 7 and Table 8, a molded product having a high tensile strength can be obtained by heating and kneading powdery polylactic acid (component A), cellulose fine powder (component B), and maleic anhydride (component C) in the presence of a radical initiator. The result also proves presence of a covalent bond between component A and component B through component C.

What is claimed is:

1. A preparation process of a composite resin composition comprising heating and kneading a mixture of 5–95% by weight of aliphatic polyester resin (component A) having aliphatic hydroxycarboxylic acid units and 95–5 % by weight of one or more biomass materials (component B) selected from the group consisting of cellulose and lignocellulose, and 1–30 parts by weight for 100 parts by weight of component A of unsaturated carboxylic acid or a derivative thereof (component C) in the presence of a radical generator.

2. The preparation process of a composite resin composition according to claim 1, wherein the unsaturated carboxylic acid or a derivative thereof (component C) is maleic acid or maleic anhydride.

3. The preparation process of a composite resin composition according to claim 1, wherein the aliphatic polyester resin (component A) having aliphatic hydroxycarboxylic acid units is polylactic acid.

4. The preparation process of a composite resin composition according to claim 2, wherein the aliphatic polyester resin (component A) having aliphatic hydroxycarboxylic acid units is polylactic acid.

5. A composite resin composition comprising a mixture of 5–95% by weight of aliphatic polyester resin (component A) having aliphatic hydroxycarboxylic acid units and 95–5% by weight of one or more biomass materials (component B) selected from the group consisting of cellulose and lignocellulose, and 1–30 parts by weight for 100 parts by weight of component A of unsaturated carboxylic acid or a derivative thereof (component C), wherein said composite resin composition comprises a component obtained by covalently bonding a portion or the whole of component A and component B through component C.

6. The composite resin composition according to claim 5, wherein the unsaturated carboxylic acid or a derivative thereof (component C) is maleic acid or maleic anhydride.

7. The composite resin composition according to claim 5, wherein the aliphatic polyester resin (component A) having aliphatic hydroxycarboxylic acid units is polylactic acid.

8. The composite resin composition according to claim 6, wherein the aliphatic polyester resin (component A) having aliphatic hydroxycarboxylic acid units is polylactic acid.

9. A method of preparing a formed item comprising heat-extruding the composite resin composition according to claim 5 into the formed item.

10. A formed item comprising the composite resin composition according to claim 5.

11. An artificial wood comprising the composite resin composition according to claim 5.

12. A container comprising the composite resin composition according to claim 5.

13. A film comprising the composite resin composition according to claim 5.

14. A sheet comprising the composite resin composition according to claim 5.

15. A tray comprising the composite resin composition according to claim 5.

16. A foam comprising the composite resin composition according to claim 5.

* * * * *